United States Patent [19]

Tanaka et al.

[11] Patent Number: 4,668,965

[45] Date of Patent: May 26, 1987

[54] METHOD OF PURGING IMPURITIES FROM A PRINTING HEAD

[75] Inventors: Yasuhiko Tanaka, Fuchu; Yoshiaki Kimura, Hachioji, both of Japan

[73] Assignee: Konishiroku Photo Industry Co., Inc., Tokyo, Japan

[21] Appl. No.: 815,791

[22] Filed: Jan. 3, 1986

Related U.S. Application Data

[63] Continuation of Ser. No. 642,707, Aug. 22, 1984, abandoned, which is a continuation of Ser. No. 446,311, Dec. 2, 1982.

[30] Foreign Application Priority Data

Dec. 9, 1981 [JP] Japan ........................ 56-199381

[51] Int. Cl.[4] ........................ G01D 15/16; G01D 9/00

[52] U.S. Cl. ........................ 346/140 R; 346/1.1

[58] Field of Search ........................ 346/140 PD, 1.1, 75, 346/140 R, 140 S

[56] References Cited

U.S. PATENT DOCUMENTS

| | | | |
|---|---|---|---|
| 4,123,761 | 10/1978 | Kimura | 346/140 PD |
| 4,125,845 | 11/1978 | Stevenson | 346/140 PD |
| 4,158,847 | 6/1979 | Heinzl | 346/140 PD |
| 4,164,745 | 8/1979 | Cielo | 346/140 PD |
| 4,176,363 | 11/1979 | Kasahara | 346/140 PD |
| 4,301,459 | 11/1981 | Isayama | 346/75 |

*Primary Examiner*—E. A. Goldberg
*Assistant Examiner*—Mark Reinhart
*Attorney, Agent, or Firm*—Finnegan, Henderson, Farabow, Garrett and Dunner

[57] ABSTRACT

A method for purging impurities from the ink path from a drop-on-demand ink jet type printing head prior to or subsequent to use in a normal printing operation includes the steps of heating the ink path to a temperature above the temperature used during the printing operation and purging ink through the ink path during or subsequent to the heating step.

12 Claims, 7 Drawing Figures

METHOD OF PURGING IMPURITIES FROM A PRINTING HEAD

This application is a continuation, of application Ser. No. 642,707, filed Aug. 22, 1984, now abandoned, which is a continuation of application Ser. No. 446,311, filed Dec. 2, 1982.

BACKGROUND OF THE INVENTION

The present invention relates to an ink jet printing apparatus wherein projects out from orifice an ink droplet and thereby prints letters and diagrams on the printing medium.

As for the ink jet printing apparatus, various types of them have been devised and put to practical use. As an example, the one of a drop-on-demand system shown in FIG. 1 can be given. In FIG. 1, 1 is an ink tank, 2 is a printing head and 3 is a common ink chamber that receives a supply of ink from the ink tank 1. Further, 4*a*, 4*b*, . . . , and 4*g* are the pressure chambers whose ends are connected to the common ink chamber 3 and 5*a*, 5*b*, . . . , 5*g* are the group of nozzles that project ink in the pressure chambers 4*a*, 4*b*, . . . , 4*g* respectively. On the flexible walls of aforesaid pressure chambers 4*a*, 4*b*, . . . , 4*g*, the piezoelectric-crystal elements (unillustrated) are arranged respectively in a manner of one element on one flexible wall and given piezoelectric-crystal element or elements are driven by the drive signals from the piezo driving section (unillustrated) and thereby ink droplets are projected out the shrunk pressure chambers 4*a*, 4*b*, . . . , and 4*g* through nozzles 5*a*, 5*b*, . . . , and 5*g*.

In addition, as the other method, the one called the continuous projecting system shown in FIG. 2 is available. In this apparatus, ink in an ink tank 11 is pressurized by a pump 12 to be supplied to an ink chamber 13 in a printing head 10. Owing to the vibration of a piezoelectric-crystal element 15 driven by the supplying pressure and a vibration source 14, the ink is continuously projected out from a nozzle 16 in the columnar form to become ink droplets. When the ink in the columnar form is separated into droplets, an electric charge corresponding to the image signal is given to the ink droplet by a charge electrode 17 and further, the flight direction of the droplet is controlled by a deflection electrode 18 and thus the image is formed.

In order to cause an ink droplet to fly correctly, high precision are requested on the shape and the surface condition of the nozzle and an ink path thereabout. There are various types of factors that prevent the correct projection and flight of the ink from the nozzle, and among those factors, there are given fine bubbles produced in the nozzle (hereinafter referred to as "bubbles" for abbreviation), clogging and dusts adhering to the outside of the nozzle and sticking into the nozzle as the one frequently occurs for the normal usage thereof. With these obstacles, there occur the phenomena wherein ink droplets can not be projected, or they can be projected but the speed thereof is abnormal or they do not fly straightly or the ink droplet splits and fly off in different direction. Namely, in the above examples, if bubbles enter the nozzles 5*a*, 5*b*, . . . , 5*g* and 16, or clogging in said nozzles takes place therein, the transmission of the pressure from the pressure chambers 4*a*, 4*b*, . . . , 4*g* or the common ink chamber 13 are prevented and further, the flow of the ink is prevented, thereby the ink droplets do not fly correctly.

Bubbles and clogging which are the causes for aforesaid obstacles are considered to happen for the following reasons.

As for the bubbles, first of all, the reasons are the following occasions: (1) the printing head receives a shock during the period of printing operation or the period of standby and owing to the abnormal acceleration caused by the above shock, the nozzle inhales bubbles, (2) when the drive signal is impressed on the piezoelectric-crystal element for the ink droplet to fly, the setting of the signal is impertinent or noises are superposed and the signal waveform is disturbed, thereby the nozzle inhales bubbles, (3) air dissolved in the ink separates out, or (4) during the preservation of the printing head, the surrounding temperature drops and the ink has a thermal contraction, thereby the nozzle inhales bubbles.

Clogging, on the other hand, takes place with ink in the nozzle drying and hardening when the printing head is left for a long time without being used or when the surrounding temperature drops abnormally. Clogging may further take place with duct or foreign substances in the ink condensing and adhering to the inside of the nozzle. Furthermore, the dust floating in the air or the paper dust from the recording paper adhere to the nozzle and enter the nozzle, thereby clogging takes place.

In order to remove bubbles and clogged substances in the nozzle which are obstacles for the normal flight of the ink droplet, there has been adopted a method in the conventional apparatus wherein the high pressure was impressed on the ink in the printing head from the ink supplying portion and thereby the bubbles and clogged substances in the nozzle are compulsorily swept away from the nozzle.

In the conventional method, however, the effect to remove the bubbles and clogged substances in the nozzle to the outside is not sufficient because the conventional method simply sweeps ink away and in many cases it was impossible to remove bubbles and clogged substances even if the ink in large amount was swept away repeatedly and was overflowed from the nozzle.

On the printing head wherein it is impossible to remove bubble or clogged substance in the nozzle, there has been taken a method wherein the ink is filled again after the ink in the head is removed, or, the print head is scrapped as condemned goods.

SUMMARY OF THE INVENTION

The present invention has been devised taking aforesaid points into consideration and it is an object of the present invention to offer an ink jet printing apparatus that enables to remove bubbles and clogged substances in the nozzle of the printing head easily.

The object of the present invention can be attained by an ink jet printing apparatus wherein a heating means to heat a part or all of an ink path including a nozzle of a print head is provided and temperatures at aforesaid portions can be raised to the extents which are higher than those in recording operation, during the period of ink-jetting in the purging operation.

DETAILED DESCRIPTION OF THE PREFERRED EMBODIMENTS

Figure 1:
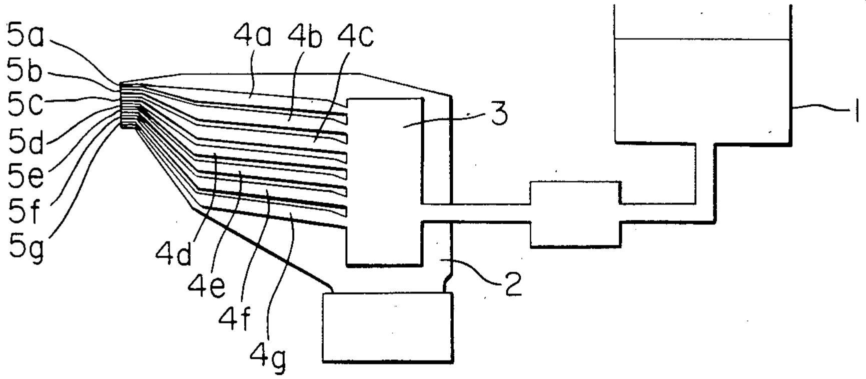
FIG. 1 PRIOR ART
FIGS. 1 and 2 are the illustrative views of the typical structures of an ink-jet printing apparatus, respectively.
Figure 2:
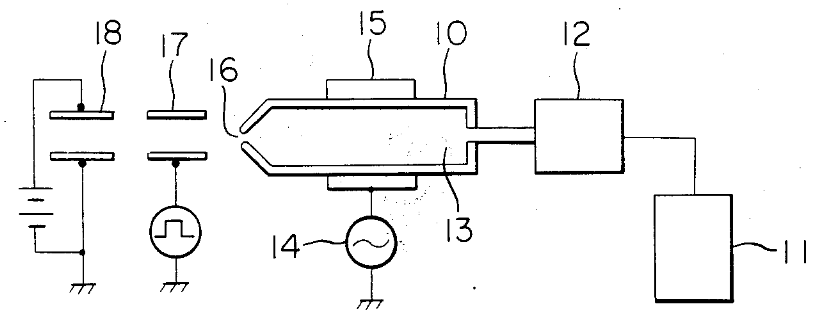
FIG. 2 PRIOR ART
Figure 3:
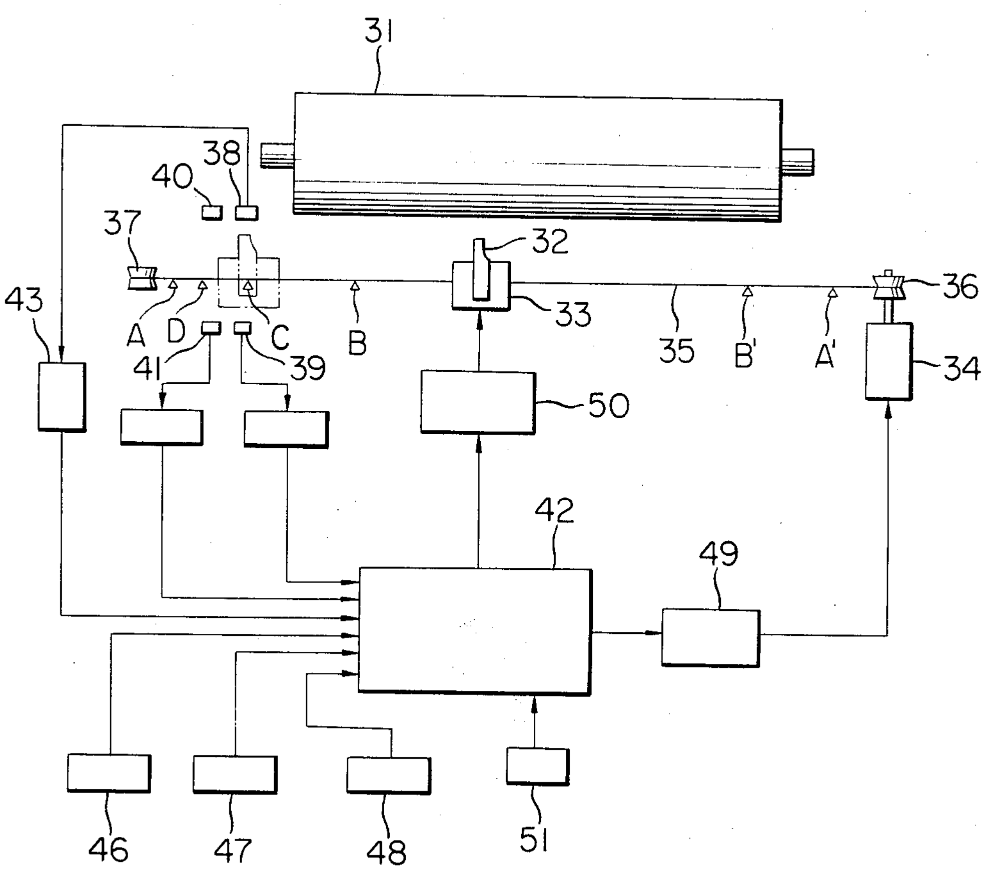
FIG. 3 is a structural view illustrating an example of the present invention.

FIG. 3 is a constitution diagram showing an example of the present invention. The exemplified apparatus represents an ink jet printing apparatus in the drop-on-demand type and in the Figure, 31 is a recording paper on the platen and printing is made thereon by the ink droplet projected from a printing head 32. The printing head 32 has plural nozzles and is mounted on a carriage 33. The carriage 33 is fixed to a conveyance belt 35 which is spread between a driving pulley 36 fixed on the output shaft of a pulse motor 34 and a tension pulley 37. This constitution makes the movement of the printing head 32 within an AA' interval possible. Incidentally, a BB' interval in the AA' interval is an interval along which the printing head 32 travels facing the recording paper, a position C is a spit position where the printing head 32 projects ink droplets successively for all channels to detect clogging etc. (hereinafter referred to as "channel failure") and a position D is a purge position where ink is forced out when a channel failure takes place. In the vicinity of the spit position C, there are provided a channel failure detector 38 that detects whether ink droplets fly correctly or not and a position detector 39 which detects that the printing head 32 is positioned at the spit position C. In the vicinity of the purge position D, on the other hand, there are provided an ink drain 40 that receives ink overflowed from each nozzle and a position detector 41 which detects that the printing head 32 is positioned at the purge position. Incidentally, the channel failure detector 48 may be of any type such as a photoelectric type or a charge amount measuring type. As position detectors 39 and 41, a micro switch, a photoelectric detector and a magnetic detector are used. The numeral 42 is a controlling section that conducts various controls and said controlling section 42 receives output signals from a detecting circuit 43 that deals with the signal from the channel failure detector 38, an amplifier 44 that amplifies output signals of the position detector 39, an amplifier 45 that amplifies output signals of the position detector 41, a timer 46, a power source switch 47, an external print commanding section 48 and a compulsory purge switching section 51 etc., and outputs control signals based on a certain sequence to the motor driving section 49 and to the, head driving section 50 etc.

Next, the printing head 32 to be used for the present example will be explained referring to FIGS. 4 and 5. Inside the printing head 32, there are formed plural pressure chambers 61, and nozzles 62, a supplying path 63, a common ink reservoir chamber 64 and a guide path 65. These pressure chambers 61 are arranged so that they form plural rows in the direction of the movement of the printing head 32 and the number of pressure chamber is determined by the character forming by dots and this drawing shows only 7 pressure chambers. The numeral 66 is a cover slip forming a side wall of the pressure chamber 61 and 67 are piezoelectric-crystal elements (in the same number as the pressure chambers 61) connected to the cover slip 66 and these 3 elements compose 7 sets of flexible wall section. The numeral 68 is a heater to heat a part (or all) of the ink path including the nozzle 62 and it consists of a printed resistance formed by etching or printing. The numeral 69 is an elastic plate composing a top cover of the ink reservoir chamber 64 and is constituted in advance so that it can expand or shrink according to the amount of ink in the chamber. The numeral 70 is a detecting means for the amount of ink provided on the top surface of the elastic plate 69 and it outputs signals showing the amount of ink in the ink reservoir chamber 64 to the controlling section 42. The numeral 71 is a balloon container made of elastic material which is for ink replenishment and, the inside thereof is set in advance so that it generates a certain pressure (e.g. 0.6–0.1 kg/cm$^2$) caused by the balloon shrinkage action of the container 71. The numeral 72 is a connection pipe that connects the guide path 65 to the balloon container 71 and 73 is an automatic valve provided on the half way of the connection pipe 72. Valve operation means 74 outputs signals to open or close the automatic valve 73 based on the output of the ink amount detecting means 70. The numeral 75 is a compulsory operation means (arranged in the head driving section 50) that opens the automatic valve 73 compulsorily. Even in the period that the automatic valve 73 is controlled by the valve operation means 74, the compulsory means 75 opens the automatic valve 73 with the output signals of the controlling section 42 and with the shrinkage action of the balloon 71, ink can be forced out from all nozzles 72, thereby the ink paths from a way out of the balloon 71 to the nozzle 62 of the printing head 32 can be purged. Incidentally, 76 is a pulse generator that generates pulse which drive piezoelectric-crystal elements 67 based on the output signals of the controlling section 42 and 77 is a heater driving circuit that drives the heater 68. These pulse generator 76 and heater driving circuit 77 are both provided in the head driving section 50.

Figure 6:
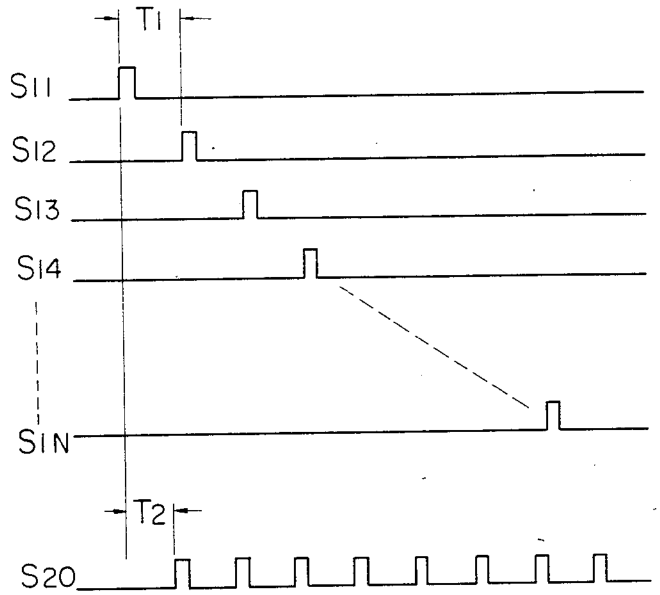
FIG. 6 is an operational diagram.

Next, the action of the ink jet printer with aforesaid constitution will be explained referring to FIG. 6. By the way, the projecting action of ink droplets from the nozzle 62 for printing operation, the ink replenishing action from the ink reservoir chamber 64 to each pressure chamber 61 and further the ink automatic conveying action to the inside of the ink reservoir chamber 64 are the same as the ones for the conventional known ink jet printer and therefore the explanation thereof will be omitted here.

An ink jet printing apparatus of the present invention conducts printing action under the control of the controlling section 42 through the scanning of the printing head 32. In this case, the controlling section 42 moves the printing head 32 to the spit position C with an interval of a certain period of time (e.g. 90 sec.). The printing head 32 stops securely and accurately at the position C because the printing head 32 stops according to the signals detected by the position detector 39. Next, the controlling section 42 starts the spit action. Namely, pulse signals S11, S12, S13, . . . S1N (N is a number of nozzles and it is 7 in the present example) that drive nozzles successively with a certain interval $T_1$ (e.g. 5 milli sec.) are outputted from the head driving section 50 to the printing head 32 as shown in FIG. 6. When ink droplets projected from each nozzle fly to and collide with the channel failure detector 38 after a certain period of time $T_2$, signals S20 shown in FIG. 6 are outputted from the channel failure detector 38 to the controlling section 42. Controlling section 42 watches whether a pulse corresponding to driving pulses S11, S12, . . . , S1N exists in S20 or not and if even a corresponding pulse does not generate the controlling section 42 judges as that the channel concerned is failed, and at the same time when nozzle 62 and the surroundings thereof are started to heat by heater 68, printhead 32 is transferred to purging position D and then conpulsory purging operation means 75 is operated after the temperature reaches at a prescribed degree or after a prescribed period of time passed, and thus, the ink flow passage inside the printhead 32 is purged all at once. Thus, such bubbles and cloggs are removed. After purging, controlling section 42 makes printing head 32 return to printing section BB′ to resume printing. If any channel failure is not detected in the abovementioned spitting action, the printing head is not transferred into a purging operation but is returned to the printing position. The automatically channel failure acts in the printing operation and on stand-by, if some channel failure is detected, the purging with heating is operating. As the channel failure detection is intermittently act, in the case that some channel failure is visually found out between channel failure detections, when printing head 32 is on stand-by, a purging with heating is similarly possible by operating compulsory purging switch 51.

As described above, when ink is only overflowed out of nozzle 62 and in addition thereto the nozzle 62 is heated up highly in advance, the efficiency of purging bubbles and cloggs becomes remarkably improved. The reasons of this effect are (1) that bubbles and solids may be accelerated to dissolve in ink at a high temperautre, (2) that because of the viscosity of ink being lowered at a high temperature, the ink flow is accelerated inside nozzle 62, and thus bubbles and cloggs will become easily removable; and (3) that because of the thermal expansion of bubbles of themselves, they will move slightly on the head member inside a nozzle to lower the contact with the head member, and thus the removal may be easily done.

Figure 4:
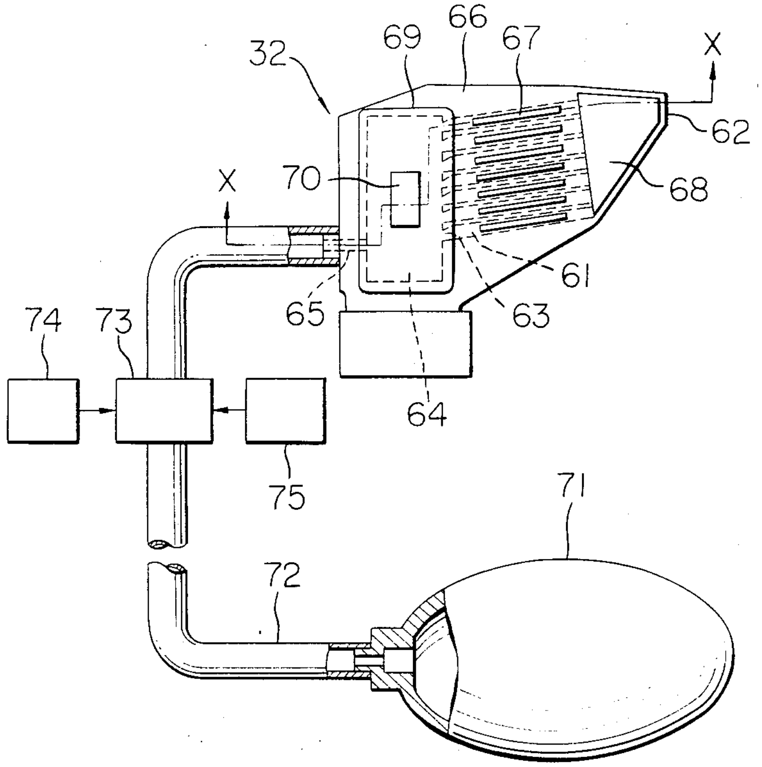
FIG. 4 is a detailed illustration of a printing head portion of the apparatus shown in FIG. 3.
Figure 5:
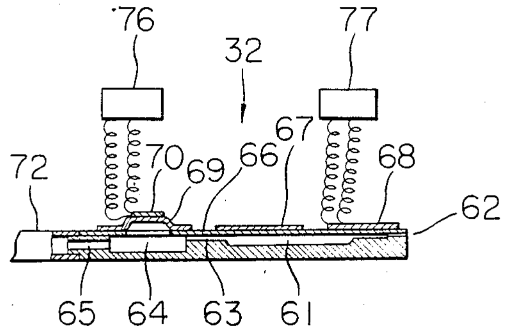
FIG. 5 is a sectional view taken on line X—X in FIG. 4.
Figure 7:
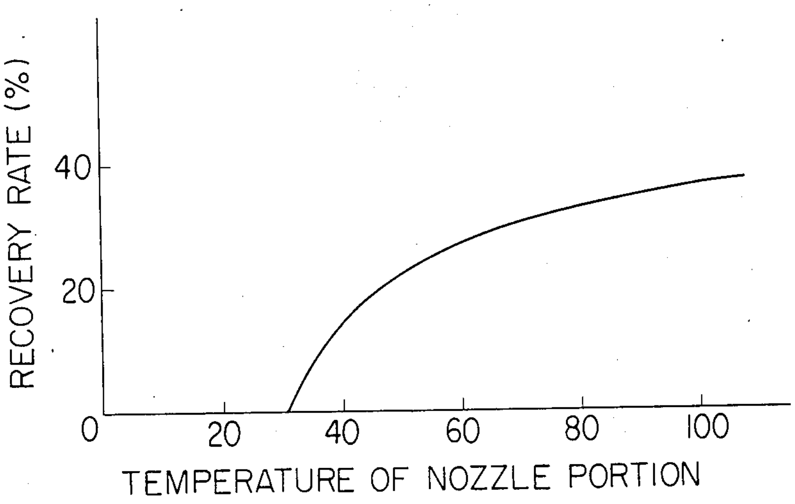
FIG. 7 is an illustrative diagram showing the characteristic curve of a restration rate.

Now, referring to the concrete data, bubbles were put into the nozzles of the print-head whose structure is shown in FIG. 4 and in FIG. 5 and ink was overflowed out for 5 seconds at the low temperature of 30° C., and the percentage of restoring the proper flying state of ink droplets (hereinafter referred to as restoration rate), was no more than 1% at that time in the case of the print-head which is hard to remove the bubbles and was then in the order of 3% even when the ink overflowing time was prolonged to 30 seconds. On the other hand, as in the invention, when the nozzles were heated up to 100° C. and ink was overflowed for 30 seconds, the restoration rate of 36% was obtained. It was also confirmed that the restoring rate increased exponentially as the ink was spitted repeatedly. FIG. 7 shows the characteristic curve exhibiting the relation between the temperatures of a nozzle portion and the restoration rates. As is obvious from the figure, when it is not higher than 30° C. the restoration rates are extremely low, and on the contrary when it is not lower than 30° C. the good effects are rapidly produced and the restoration rates are getting improved as a temperature becomes higher.

As for heater 68, it is most favorable from the viewpoint of manufacture to produce of the abovementioned printed resistor, and in addition, a normal resistance wire or the so-called sheet heating units may be used for.

A constant heating element may also be used. For example, POSISTOR (manufactured by Murata Mfg. Co.) and the like are effective. In such a case, if there use a plurality of constant heating elements having the different Curie points from each other, the plural stages of temperature controls may be performed in a very simple circuit.

Further, in order to improve the effects of the means of the invention, it is very effective to set the pressure higher to apply to ink being overflowed out from each of the nozzles. There is an example where the restoration rate was improved by 15% by making the pressure higher by 30% and higher.

It is also very effective to prolong further the time for overflowing ink out of nozzles, provided that there may also be some instances where the intermittent repetition of a short-time overflowing may produce the effects with a lesser amount consumed of ink as compared with a long-time continuous overflowing of ink.

In the case of a print-head which is particularly hard to purge bubbles invaded inside nozzles, the restoration rate of a nozzle in failure was not higher than 1% when ink was spitted at 80° C. for 5 seconds, but on the contrary the restoration rate was improved up to 25% when ink was spitted out twice for 5 seconds each with the interval for 5 seconds.

Further, more better effects may be obtained by starting to overflow ink after keeping a high temperature for a certain period of time rather than by starting to overflow ink immediately at the point of time when the nozzle portions and ink flow channels are heated up to reach a fixed temperature.

Still further, it is possible to shorten the time required for the whole purging operation by starting to overflow ink before the nozzle portions and the ink flow channels are heated up to a fixed temperature. It becomes also possible to shorten the time required for cooling the nozzle portions by continuing the ink-overflowing in succession even after the heating is completed to apply. In this case, it is particularly effective to shorten the time for intermitting a recording operation if it should be waited until the ink viscosity is recovered to a fixed degree because of a great temperature coefficient of the ink viscosity.

In the above example, a channel failure is automatically detected, and it is however needless to say that the invention is applicable to such an ink-jet recording apparatus in which a channel failure is constantly detected with the eye.

As described above, in accordance with the invention, it is possible to remove bubbles and cloggs at a very high efficiency as compared with a conventional apparatus.

What is claimed is:

1. A method for purging impurities from the ink path of a drop-on-demand ink jet printing head prior to or subsequent to use in a normal printing operation performed at a selected printing operation temperature and pressure, comprising the steps of:

heating the ink path in the head with a heater on the head to a temperature above the temperature used during the printing operation and purging ink through the ink path after the heating step starts.

2. The method of claim 1, wherein said step of heating the ink path includes heating a nozzle located in the ink path.

3. A method for purging impurities from the ink path of a drop-on-demand ink jet type printing head prior to or subsequent to use in a normal printing operation performed at a selected printing operation temperature and pressure, comprising the steps of:

heating the ink in the head to a temperature above the temperature used during the printing operation and purging ink at a pressure which is higher than the pressure used during the printing operation through the ink path after the heating step starts.

4. The method of claim 3 wherein the purging step includes purging the ink at a pressure which is generally at least 30% higher than the pressure used during the printing operation.

5. The method of claim 3 wherein the purging step includes at least two purging substeps separated by a non-purging substep.

6. The method of claim 3 wherein the purging step includes at least two purging substeps, each for approximately five seconds, separated by a non-purging substep.

7. The method of claim 3 wherein the purging step includes at least two purging substeps, each for approximately five seconds, separated by a non-purging substep for approximately five seconds.

8. The method of claim 3 wherein the purging step occurs subsequent to the heating step.

9. The method of claim 3 wherein the heating step is concluded prior to the conclusion of the purging step.

10. The method of claim 3 wherein the purging step occurs subsequent to the heating step and the heating step is concluded prior to the conclusion of the purging step.

11. The method of claim 3 wherein the heating step includes heating the ink path to a temperature generally in the range of 50° to 100° C.

12. The method of claim 3 wherein the heating step includes heating the ink path to a temperature at least 30° C. higher than the temperature used during the printing operation.

* * * * *